United States Patent
Sauvageau et al.

(10) Patent No.: US 12,403,965 B2
(45) Date of Patent: Sep. 2, 2025

(54) MULTI-MEMBER FRAME ASSEMBLY FOR A TRACK SYSTEM

(71) Applicant: SOUCY INTERNATIONAL INC., Drummondville (CA)

(72) Inventors: Yves Sauvageau, Drummondville (CA); Branislav Nanac, Drummondville (CA); David Barry, Longueuil (CA); Maxime Rivard, Blainville (CA); Roch Gaudreau, Baie d'Urfe (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 611 days.

(21) Appl. No.: 17/791,718

(22) PCT Filed: Jan. 22, 2021

(86) PCT No.: PCT/IB2021/050506
§ 371 (c)(1),
(2) Date: Jul. 8, 2022

(87) PCT Pub. No.: WO2021/149007
PCT Pub. Date: Jul. 29, 2021

(65) Prior Publication Data
US 2023/0044095 A1    Feb. 9, 2023

Related U.S. Application Data

(60) Provisional application No. 62/964,959, filed on Jan. 23, 2020.

(51) Int. Cl.
*B62D 55/108*    (2006.01)
*B62D 55/084*    (2006.01)
*B62D 55/10*    (2006.01)

(52) U.S. Cl.
CPC ....... *B62D 55/1086* (2013.01); *B62D 55/084* (2013.01); *B62D 55/10* (2013.01)

(58) Field of Classification Search
CPC .............. B62D 55/104; B62D 55/1086; B62D 55/084; B62D 55/10
See application file for complete search history.

(56) References Cited

U.S. PATENT DOCUMENTS 1,794,332 A  *  2/1931  Snow, Jr. ............... B62D 55/10
                                                     305/134
2,333,107 A     11/1943  Knox
(Continued)

FOREIGN PATENT DOCUMENTS

CA      2980905 A1    10/2018
CN     105711667 A     6/2016
(Continued)

OTHER PUBLICATIONS

International search Report from PCT/IB2021/050504, Shane Thomas, May 18, 2021.
(Continued)

*Primary Examiner* — Jason R Bellinger
(74) *Attorney, Agent, or Firm* — BCF LLP

(57) ABSTRACT

A multi-member frame assembly for a track system includes a pivot pin defining a pivot axis, a leading frame member pivotally connected to the pivot pin for pivoting about the pivot axis, and a trailing frame member pivotally connected to the pivot pin for pivoting about the pivot axis, the trailing frame member pivoting independently from the leading frame member. A resilient member is pivotally connected to the leading frame member and to the trailing frame member. The resilient member extends generally vertically between (Continued)

the leading frame member and the trailing frame member. A track system having a multi-member frame assembly is also described.

14 Claims, 12 Drawing Sheets

(56) References Cited

U.S. PATENT DOCUMENTS

| | | | |
|---|---|---|---|
| 2,403,362 A | 7/1946 | Hait et al. |
| 2,427,006 A | 9/1947 | Konx |
| 2,860,715 A | 11/1958 | Bouffort |
| 3,168,929 A | 2/1965 | Wardle |
| 3,323,811 A | 6/1967 | Nelson |
| 3,434,708 A | 3/1969 | Hawk, Jr. |
| 3,464,512 A | 9/1969 | Schaffner |
| 3,677,535 A | 7/1972 | Beck |
| 3,706,481 A | 12/1972 | Kramer |
| 3,841,424 A | 10/1974 | Purcell |
| 3,913,987 A | 10/1975 | Baldwin et al. |
| 3,920,231 A | 11/1975 | Harrison et al. |
| 3,938,606 A | 2/1976 | Yancey |
| 4,193,612 A | 3/1980 | Masser |
| 4,202,564 A | 5/1980 | Strader |
| 4,351,572 A | 9/1982 | Fujiware |
| 4,361,363 A | 11/1982 | Livesay |
| 4,519,654 A | 5/1985 | Satzler |
| 4,582,367 A | 4/1986 | Jacquet et al. |
| 5,183,287 A | 2/1993 | VanSweden |
| 5,340,205 A | 8/1994 | Nagorcka |
| 5,749,423 A | 5/1998 | Burckhartzmeyer |
| 5,829,848 A | 11/1998 | Kelderman |
| 5,899,543 A | 5/1999 | Lykken et al. |
| RE36,284 E | 8/1999 | Kelderman |
| 5,954,148 A | 9/1999 | Okumura et al. |
| 6,234,590 B1 | 5/2001 | Satzler |
| 6,286,857 B1 | 9/2001 | Reese |
| 6,712,549 B2 | 3/2004 | Roth |
| 6,951,260 B1 | 10/2005 | Isley |
| 7,533,741 B2 | 5/2009 | Brazier |
| 8,118,374 B2 | 2/2012 | Canossa |
| 8,147,007 B2 | 4/2012 | Rainer |
| 8,573,336 B2 | 11/2013 | Arulraja et al. |
| 8,794,358 B2 | 8/2014 | Hansen |
| 9,415,818 B1 * | 8/2016 | Tiede ............... B62D 55/10 |
| 9,452,796 B2 | 9/2016 | Franck et al. |
| 9,505,454 B1 | 11/2016 | Kautsch |
| 9,694,861 B2 | 7/2017 | Thomas et al. |
| 9,828,047 B2 | 11/2017 | Eavenson, Sr. et al. |
| 10,112,663 B1 | 10/2018 | Kautsch |
| 10,137,949 B2 * | 11/2018 | Kahlig ............... B62D 55/244 |
| 10,647,367 B2 | 5/2020 | Lussier et al. |
| 11,299,220 B2 | 4/2022 | Sauvageau et al. |
| 11,814,118 B2 | 11/2023 | Sauvegaeau et al. |
| 2007/0029871 A1 | 2/2007 | Wake et al. |
| 2010/0244554 A1 | 9/2010 | Yoshida et al. |
| 2011/0309672 A1 | 12/2011 | Thorson |
| 2014/0138169 A1 | 5/2014 | Fairhead |
| 2015/0217816 A1 | 8/2015 | Franck et al. |
| 2015/0321711 A1 | 11/2015 | Vik et al. |
| 2017/0166270 A1 | 6/2017 | Sewell |
| 2017/0225726 A1 | 8/2017 | Johnson |
| 2017/0225727 A1 | 8/2017 | Sauvageau et al. |
| 2017/0274946 A1 | 9/2017 | Vik et al. |
| 2018/0022407 A1 | 1/2018 | Lussier et al. |
| 2018/0237084 A1 | 8/2018 | Nam et al. |
| 2018/0273120 A1 | 9/2018 | Laban et al. |
| 2019/0118879 A1 | 4/2019 | Gustafson |
| 2019/0359268 A1 | 11/2019 | Hellholm et al. |
| 2022/0089232 A1 | 3/2022 | Aubin-Marchand et al. |

FOREIGN PATENT DOCUMENTS

| | | |
|---|---|---|
| DE | 920590 C | 11/1954 |
| DE | 20000737 U1 | 4/2000 |
| EP | 2060416 B1 | 10/2013 |
| JP | 200882417 A | 4/2008 |
| JP | 2008082417 A | 4/2008 |
| JP | 2010202057 A | 9/2010 |
| JP | 2020157911 A | 10/2020 |
| WO | 0160683 A1 | 8/2001 |
| WO | 201912453 A3 | 2/2019 |
| WO | 2019012453 A3 | 2/2019 |
| WO | 2019078119 A1 | 4/2019 |

OTHER PUBLICATIONS

International search Report from PCT/IB2021/050506, Shane Thomas, Jul. 22, 2021.
International search Report from PCT/IB2021/050506, Blaine Ré Copenheaver, May 25, 2021.
European Search from 21744110.4, Jun. 11, 2024, Andras Szaip.
English abstract of JP2020157911 retrieved from Espacenet on Feb. 9, 2023.
European Search Report from 21744427.2 dated Feb. 5, 2024, Altmann, Bernhard.
English abstract for WO2019078119 retrieved from Espacenet on Jun. 1, 2021.
English abstract of JP200882417 retrieved from Espacenet on Feb. 9, 2023.
English abstract of CN105711667 retrieved from Espacenet on May 29, 2025.
English abstract of JP2008082417 retrieved from Espacenet on May 29, 2025.

* cited by examiner

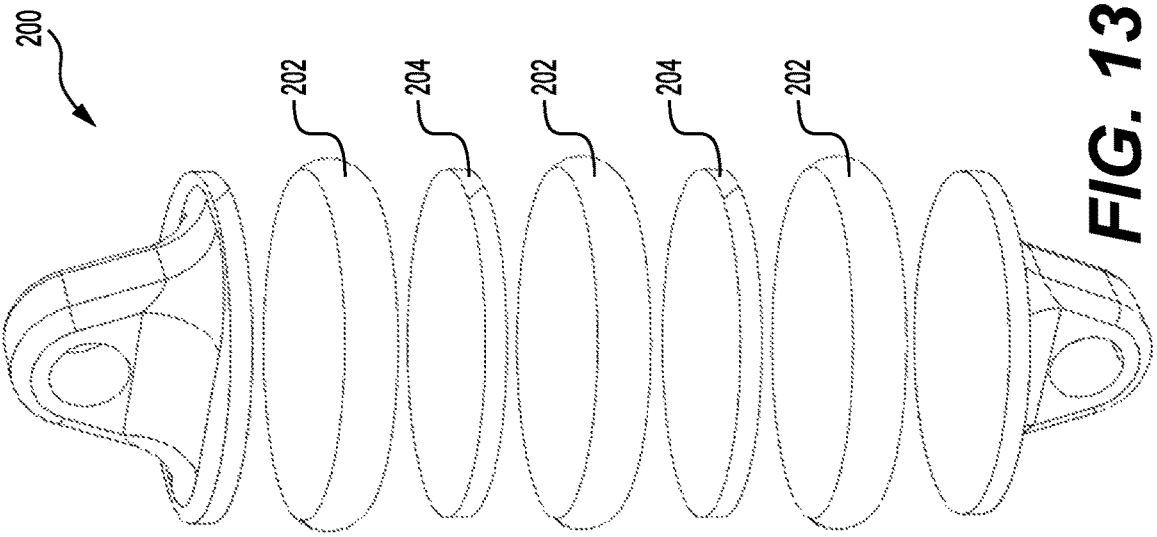
FIG. 13
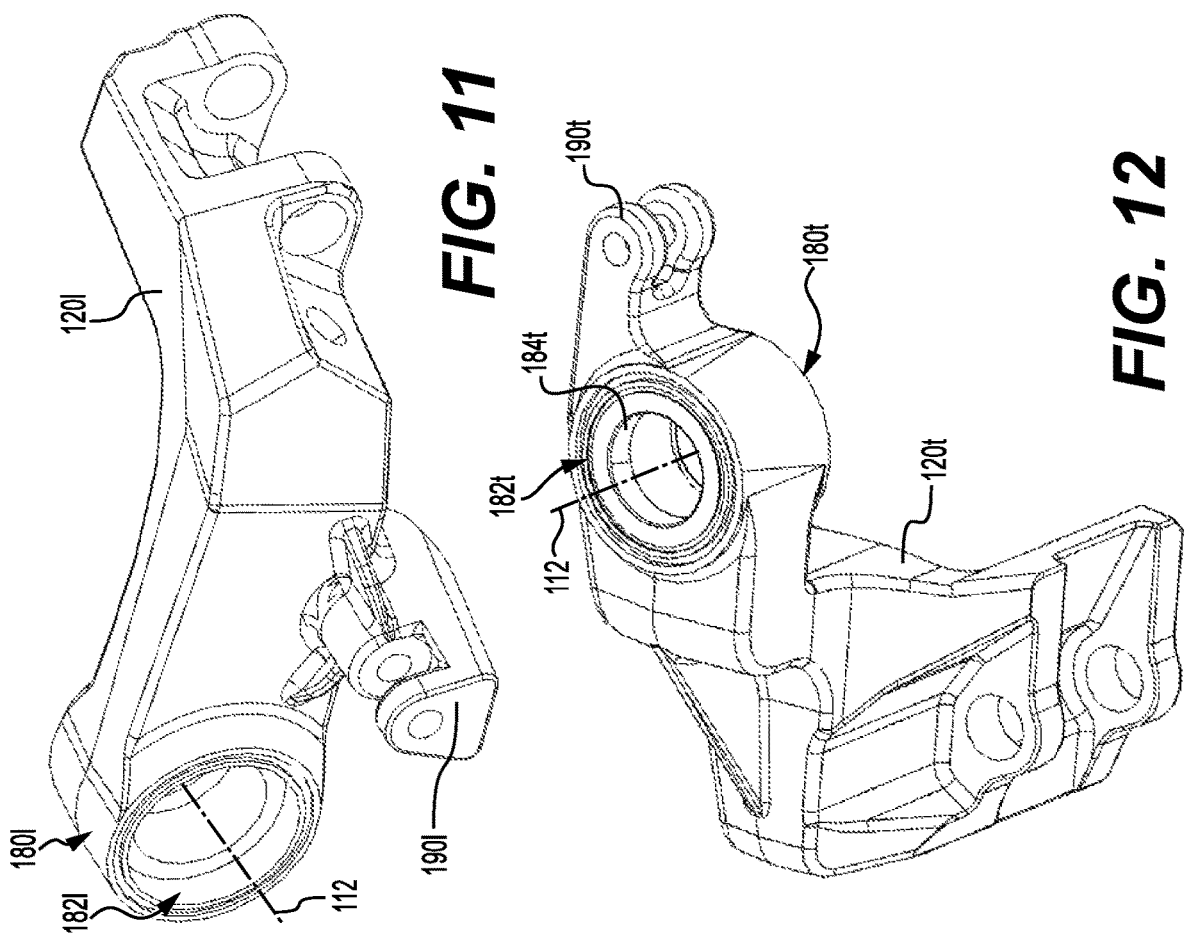
FIG. 11
FIG. 12

MULTI-MEMBER FRAME ASSEMBLY FOR A TRACK SYSTEM

CROSS-REFERENCE TO RELATED APPLICATION

The present application is a National Stage entry of International Application No. PCT/IB2021/050506, under 35 U.S.C. § 371, filed Jan. 22, 2021, which claims priority to U.S. Patent Application Ser. No. 62/964,959 entitled "Track System" and filed on Jan. 23, 2020, which is incorporated herein by reference in its entirety.

FIELD OF THE TECHNOLOGY

This present technology relates to frame assemblies for track systems.

BACKGROUND

Certain vehicles, such as, for example, agricultural vehicles (e.g., harvesters, combines, tractors, agriculture implement, etc.) and construction vehicles (e.g., bulldozers, front-end loaders, etc.), are used to perform work on ground surfaces that are soft, slippery and/or uneven (e.g., soil, mud, sand, ice, snow, etc.).

Conventionally, such vehicles have had large wheels with tires to move the vehicle along the ground surface. Under some conditions, such tires may have poor traction on some ground surfaces and, as these vehicles are generally heavy, the tires may compact the ground surface in an undesirable way owing to the weight of the vehicle. As an example, when the vehicle is an agricultural vehicle, the tires may compact the soil in such a way as to undesirably inhibit the growth of crops. In order to reduce the aforementioned drawbacks, to increase traction and to distribute the weight of the vehicle over a larger area on the ground surface, track systems were developed to be used in place of at least some of the wheels and tires on the vehicles.

Despite ongoing developments in the field of track systems, there is still room for further improvements for track systems configured to be used on wheeled vehicles. More particularly, improvements related to characteristics of track system, such as ride quality, traction and durability, are desirable. In addition, improving such characteristics in a cost effective manner has proven to be challenging, and thus continued improvements in this area remain desirable.

SUMMARY

It is therefore an object of the present technology to ameliorate the situation with respect to at least one of the inconveniences present in the prior art.

In accordance with one aspect of the present technology, there is provided a multi-member frame assembly for a track system, the multi-member frame assembly being operatively connectable to an axle of a vehicle. The multi-member frame assembly includes a pivot pin defining a pivot axis, the pivot pin being at least indirectly connectable to the axle of the vehicle, a leading frame member pivotally connected to the pivot pin for pivoting about the pivot axis, a trailing frame member pivotally connected to the pivot pin for pivoting about the pivot axis, the trailing frame member pivoting independently from the leading frame member, and a resilient member pivotally connected to the leading frame member and to the trailing frame member, the resilient member extending generally vertically between the leading frame member and the trailing frame member.

In some implementations, the leading frame member defines a leading loop structured and dimensioned for receiving the pivot pin therein, and a leading annular spacing is defined between the leading loop and the pivot pin. The trailing frame member defines a trailing loop structured and dimensioned for receiving the pivot pin therein, and a trailing annular spacing is defined between the trailing loop and the pivot pin. The multi-member frame assembly further includes a leading annular torsion spring disposed in the leading annular spacing, the leading annular torsion spring being connected to the leading frame member and to the pivot pin for pivotally biasing the leading frame member about the pivot axis, and a trailing annular torsion spring disposed in the trailing annular spacing, the trailing annular torsion spring being connected to the trailing frame member and to the pivot pin for pivotally biasing the trailing frame member about the pivot axis.

In some implementations, the multi-member frame assembly further includes a leading tab connected to the leading frame member, and a trailing tab connected to the trailing frame member, the leading and trailing tabs extending on a same longitudinal side of the pivot axis, and the resilient member being pivotally connected to the leading and trailing tabs.

In accordance with another aspect of the present technology, there is provided a track system for use with a vehicle having a chassis and an axle extending laterally outwardly from the chassis for driving the track system. The track system includes a multi-member frame assembly operatively connectable to the axle. The multi-member frame assembly includes a pivot pin defining a pivot axis, the pivot pin being at least indirectly connectable to the axle of the vehicle, a leading frame member pivotally connected to the pivot pin for pivoting about the pivot axis, a trailing frame member pivotally connected to the pivot pin for pivoting about the pivot axis, the trailing frame member pivoting independently from the leading frame member, a leading wheel-bearing frame member at least indirectly pivotally connected to the leading frame member, and a trailing wheel-bearing frame member at least indirectly pivotally connected to the trailing frame member, a resilient member interconnecting the leading frame member and the trailing frame member, a leading idler wheel assembly rotatably connected to the leading wheel-bearing frame member, a trailing idler wheel assembly rotatably connected to the trailing wheel-bearing frame member, a first support wheel assembly at least indirectly connected to the leading wheel-bearing frame member, a second support wheel assembly at least indirectly connected to the trailing wheel-bearing frame member, and a sprocket wheel operatively connected to the axle.

In some implementations, the leading frame member defines a leading loop structured and dimensioned for receiving the pivot pin therein, and a leading annular spacing is defined between the leading loop and the pivot pin. The trailing frame member defines a trailing loop structured and dimensioned for receiving the pivot pin therein, and a trailing annular spacing is defined between the trailing loop and the pivot pin. The track system further includes a leading annular torsion spring disposed in the leading annular spacing, the leading annular torsion spring being connected to the leading frame member and to the pivot pin for pivotally biasing the leading frame member about the pivot axis, and a trailing annular torsion spring disposed in the trailing annular spacing, the trailing annular torsion spring being connected to the trailing frame member and to the pivot pin for pivotally biasing the trailing frame member about the pivot axis.

In some implementations, the leading and trailing annular torsion springs are rubber bushings.

In some implementations, the track system further includes a leading tab connected to the leading frame member, and a trailing tab connected to the trailing frame member, the leading and trailing tabs extending on a same longitudinal side of the pivot axis, and the resilient member being pivotally connected to the leading and trailing tabs.

In some implementations, the resilient member extends generally vertically.

In some implementations, the resilient member is disposed laterally inwardly from a majority of at least one of the leading and trailing frame members.

In some implementations, the resilient member includes first and second resilient elements, and a plate connected to the first and second resilient elements and disposed between the first and second resilient elements.

In some implementations, the track system further includes an axle casing rotatably connectable to the axle, and at least one pivot pin bracket connecting the axle casing to the pivot pin, thereby operatively connecting the multi-member frame assembly to the axle of the vehicle.

In some implementations, the track system further includes leading and trailing stops connected to the axle casing, the leading and trailing stops being structured and dimensioned to limit pivotal movement of the leading and trailing frame members. In some implementations, the track system further includes an endless track extending around the sprocket wheel, the leading idler wheel assembly, the trailing idler wheel assembly, and the first and second support wheel assemblies, the endless track being drivable by the sprocket wheel.

In some implementations, the endless track has a ground-contacting area that increases in size as a load borne by the track system increases.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Should there be any difference in the definitions of term in this application and the definition of these terms in any document included herein by reference, the terms as defined in the present application take precedence.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 11 is a perspective view taken from a top, front, right side of the leading frame member of the track system of FIG. 6;

FIG. 12 is a perspective view taken from a bottom, front, right side of the trailing frame member of the track system of FIG. 6; and FIG. 13 is an exploded, perspective view taken from a top, front, left side of the resilient member of the track system of FIG. 6.

DETAILED DESCRIPTION

With reference to FIGS. 1 to 8, an implementation of the present technology, track system 40, will be described. It is to be expressly understood that the track system 40 is merely an implementation of the present technology. Thus, the description thereof that follows is intended to be only a description of illustrative examples of the present technology. This description is not intended to define the scope or set forth the bounds of the present technology. In some cases, what are believed to be helpful examples of modifications or alternatives to track system 40 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing or embodying that element of the present technology. As a person skilled in the art would understand, this is likely not the case. In addition, it is to be understood that the track system 40 may provide in certain aspects a simple implementation of the present technology, and that where such is the case it has been presented in this manner as an aid to understanding. As persons skilled in the art would understand, various implementations of the present technology may be of a greater complexity than what is described herein.

Figure 2:
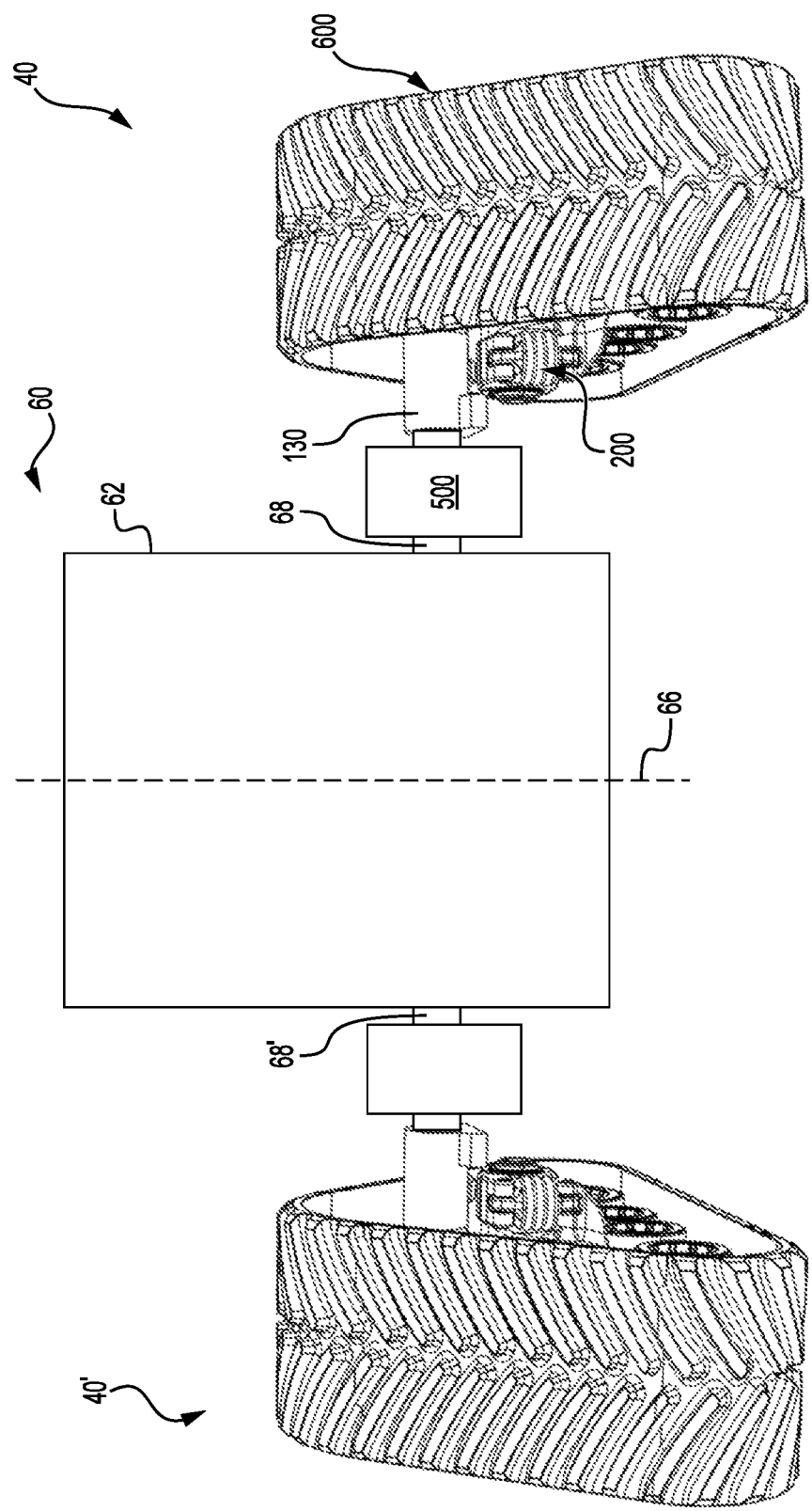
FIG. 2 is a front elevation view of a vehicle having the track system of FIG. 1 operatively connected to the left side thereof, and another track system being a mirror image of the track system of FIG. 1 operatively connected to the right side thereof.

Referring to FIG. 2, the track system 40 is for use with a vehicle 60 (schematically shown in FIG. 2) having a chassis 62 and an axle 68 extending laterally outwardly from the chassis 62 for driving the track system 40. The chassis 62 supports the various components of the vehicle 60. In some implementations, the vehicle 60 is an agricultural vehicle. However, the track system 40 could be used on different types of vehicles that serve many different functions. In FIG. 2, a track system 40' being a mirror image of the track system 40 is shown operatively connected to an axle 68' extending on a right side of the vehicle 60. Only the track system 40 configured to be operatively connected to a left side of the vehicle 60 will be described below and in the accompanying Figures.

In the context of the following description, "outward" or "outwardly" means away from a longitudinal center plane 66 (FIG. 2) of the chassis 62 of the vehicle 60, and "inward" or "inwardly" means toward the longitudinal center plane 66. In addition, in the context of the following description, "longitudinal" or "longitudinally" means in a direction parallel to the longitudinal center plane 66 of the chassis 62 of the vehicle 60 in a plane parallel to flat level ground, "lateral" or "laterally" means in a direction perpendicular to the longitudinal center plane 66 in a plane parallel to flat level ground, and "vertical" or "vertically" means in a direction perpendicular to the longitudinal center plane 66 along a height direction of the track system 40 in a plane perpendicular to flat level ground. Note that in the Figures, a "+" symbol is used to indicate an axis of rotation or pivot. In the context of the present technology, the term "axis" may be used to indicate an axis of rotation, or the term may refer to a "pivot joint" that includes all the necessary structure (bearing structures, pins, axles and other components) to permit a structure to pivot about such axis, as the case may be.

Figure 1:
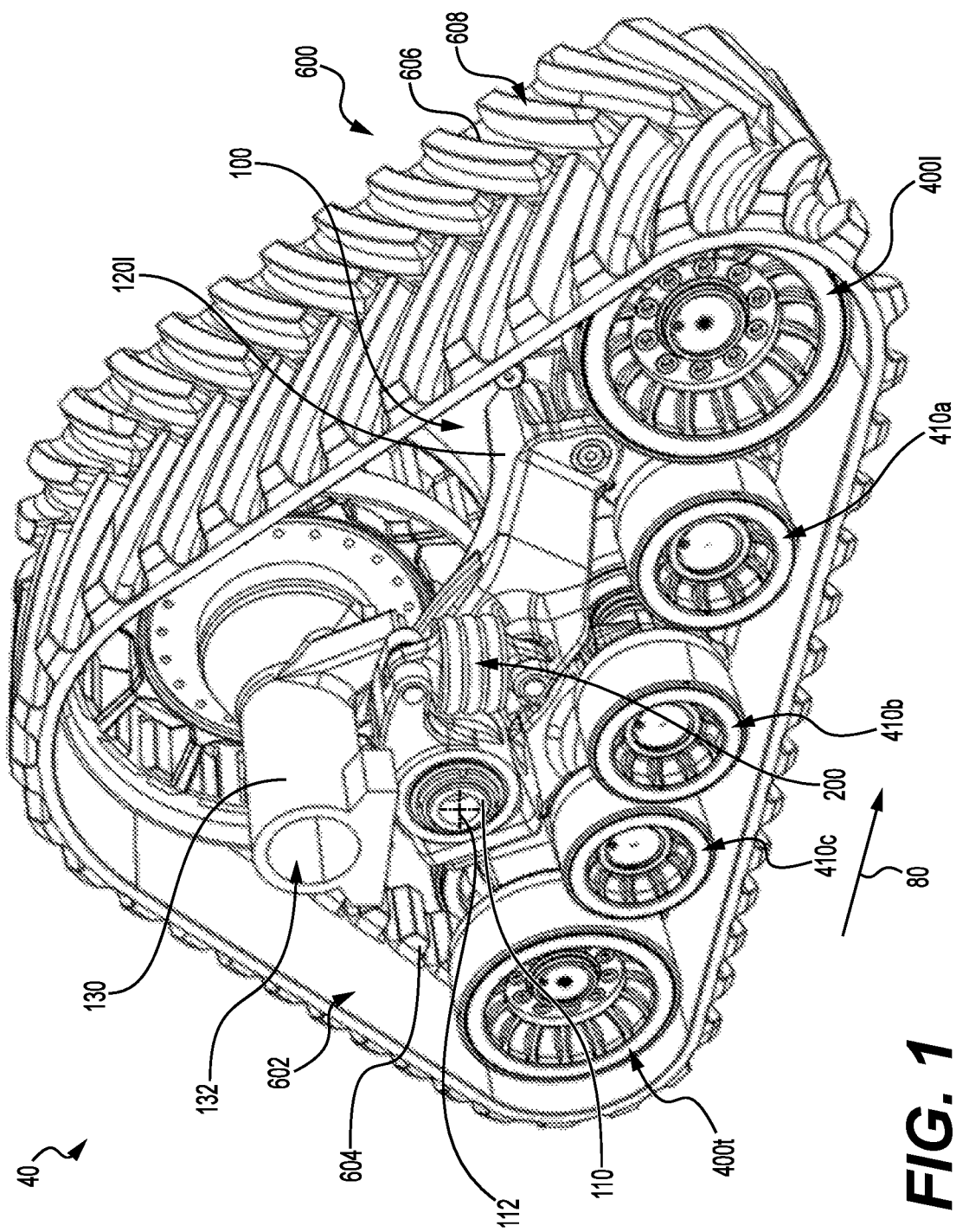
FIG. 1 is a perspective view taken from a top, front, right side of a track system being configured to be operatively connected on a left side of a vehicle.

Moreover, the direction of forward travel of the track system 40 is indicated by an arrow 80 (FIG. 1). In the present description, the "leading" components are identified with an "l" added to their reference numeral (i.e. components towards the front of the vehicle defined consistently with the vehicle's forward direction of travel), and the "trailing" components are identified with a "t" added to their reference numeral (i.e. components towards the rear of the vehicle defined consistently with the vehicle's forward direction of travel).

Furthermore, it is to be understood in the present description that a wheel assembly includes one or more wheels, an axle for supporting the one or more wheels, and the components (bearings, seals, etc.) that are necessary for the wheel(s) to rotate. As such, the different wheel assemblies will not be described in great details in the current description. Moreover, the expression "at least indirectly connected" is understood to mean that a component may be connected to another component via one or more intermediate structures or members, and that these intermediate structures are not necessarily described in the current description. Finally, the expression "track system is at a rest position" is understood to mean that the track system 40 is connected to the vehicle 60, is stationary, and is disposed on flat, level ground.

Referring to FIGS. 1 to 8, the track system 40 will be generally described. The track system 40 has a multi-member frame assembly 100. The multi-member frame assembly 100 includes a pivot pin 110 defining a pivot axis 112, a leading frame member 120l pivotally connected to the chassis 62 of the vehicle 60 via the pivot pin 110 for pivoting about the pivot axis 112, and a trailing frame member 120t also pivotally connected to the pivot pin 110 for pivoting about the pivot axis 112 independently from the leading frame member 120l.

The track system 40 further has an axle casing 130 defining an aperture 132 that is sized and configured for allowing passage of the axle 68 therethrough. The axle casing 130 is rotatably connected to the axle 68 via bearings (not shown) disposed in the aperture 132. Inward and outward pivot pin brackets 140 (shown in FIG. 7) are connected to the axle casing 130, and extend downwardly therefrom. In the present implementation, the pivot pin brackets 140 are pillow blocks, but they could differ in other implementations. The inward and outward pivot pin brackets 140 are operatively connected to the inward and outward ends of the pivot pin 110. The multi-member frame assembly 100 is thus operatively connected to the axle 68 of the vehicle 60 via the pivot pin brackets 140. Leading and trailing stops 134l, 134t (FIGS. 7 and 8) are connected to the axle casing 130. The leading and trailing stops 134l, 134t are structured and dimensioned to limit pivotal movement of the leading and trailing frame members 120l, 120t. It is contemplated that, in some implementations, the leading and trailing stops 134l, 134t could be connected to the chassis 62 of the vehicle 60 rather than connected to the axle casing 130.

The multi-member frame assembly 100 further includes a leading wheel-bearing frame member 160l pivotally connected to the leading frame member 120l, and a trailing wheel-bearing frame member 160t pivotally connected to the trailing frame member 120t. Pins 162 (FIGS. 7 and 8) are used to pivotally connect the leading wheel-bearing frame member 160l and the trailing wheel-bearing frame member 160t to the leading frame member 120l and the trailing frame member 120t respectively. A trailing tandem assembly 170t is pivotally connected to the trailing wheel-bearing frame member 120t.

The track system 40 further includes a resilient member 200 interconnecting the leading frame member 120l and the trailing frame member 120t. As such, the pivotal motion of the leading frame member 120l relative to the trailing frame member 120t is dampened by the resilient member 200.

When the track system 40 supports the weight of the vehicle 60, the resilient member 200 is deformed (i.e. compressed). Under certain conditions, vibrations that are caused by the ground surface on which the track system 40 travels, and that are transferred to the leading and trailing frame members 120l, 120t, are dampened by the resilient member 200, and thus shocks and vibrations transferred from the ground to the vehicle 60 are attenuated in certain conditions. As a result, wear of components is reduced and the comfort that a user of the vehicle 60 experiences when riding the vehicle 60 equipped with the track system 40 is improved compared to other track systems.

A leading idler wheel assembly 400l is rotatably connected to the leading wheel-bearing frame member 160l, and a trailing idler wheel assembly 400t is rotatably connected to the trailing wheel-bearing frame member 160t. A plurality of support wheel assemblies 410a, 410b, 410c are disposed intermediate the leading idler wheel assembly 400l and the trailing idler wheel assembly 400t. The support wheel assemblies 410b, 410c are rotatably connected to the trailing tandem assembly 170t, and as mentioned above, the trailing tandem assembly 170t is pivotally connected to the trailing wheel-bearing frame member 120t. It is contemplated that the support wheel assemblies 410a, 410b, and 410c could be connected in different configurations in other implementations.

Referring to FIG. 2, the track system 40 includes a gearbox 500 operatively connected to the axle 68 of the vehicle 60, and supported by the axle casing 130. The gearbox 500 is adapted to modify the driving force provided by the axle 68. The track system 40 further includes a sprocket wheel 550 operatively connected to the axle the axle 68. As such, the driving force is transferred from the axle 68 to the sprocket wheel 550. In other implementations, the gearbox 500 could be omitted and the axle 68 could be directly operatively connected to the sprocket wheel 550 and extending through the axle casing 130.

The track system 40 further includes an endless track 600 extending around the sprocket wheel 550, the leading idler wheel assembly 400l, the trailing idler wheel assembly 400t, and the plurality of support wheel assemblies 410a, 410b, 410c. The endless track 600 is drivable by the sprocket wheel 550. The leading idler wheel assembly 400l is operatively connected to a tensioner assembly 402 (FIG. 7) adapted to move the leading idler wheel assembly 400l forward and backward to control a tension in the endless track 600. In some implementations, the tensioner assembly 402 includes a dynamic tensioning device as described in commonly owned International Patent Application No. PCT/CA2016/050419, filed Apr. 11, 2016, entitled "Dynamic Tensioner Locking Device for a Track System and Method Thereof", and published as WO 2016/161528. The content of this application is incorporated herein by reference in its entirety.

Figure 3A:
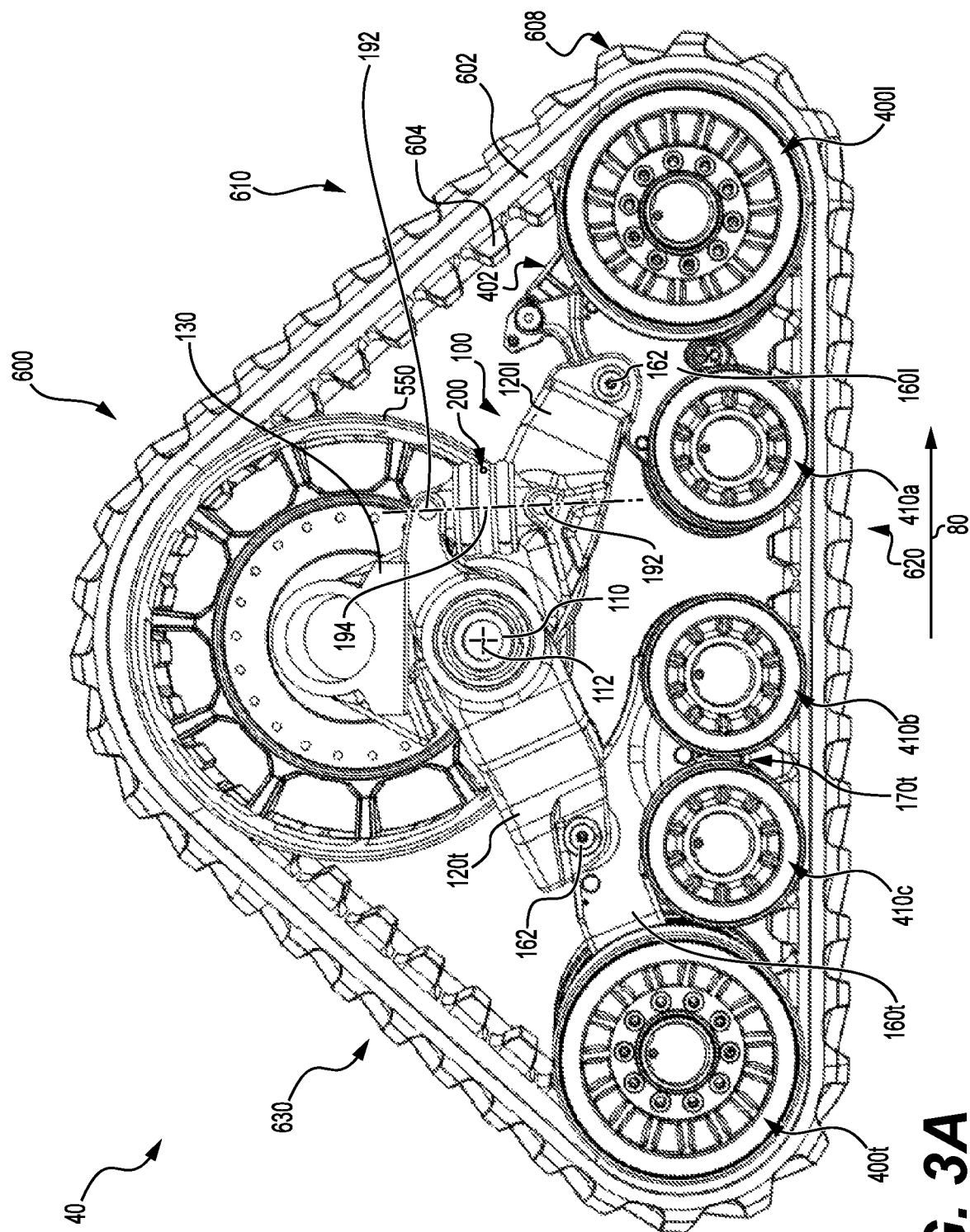
FIGS. 3A and 3B are right side elevation views of the track system of FIG. 1.
Figure 3B:
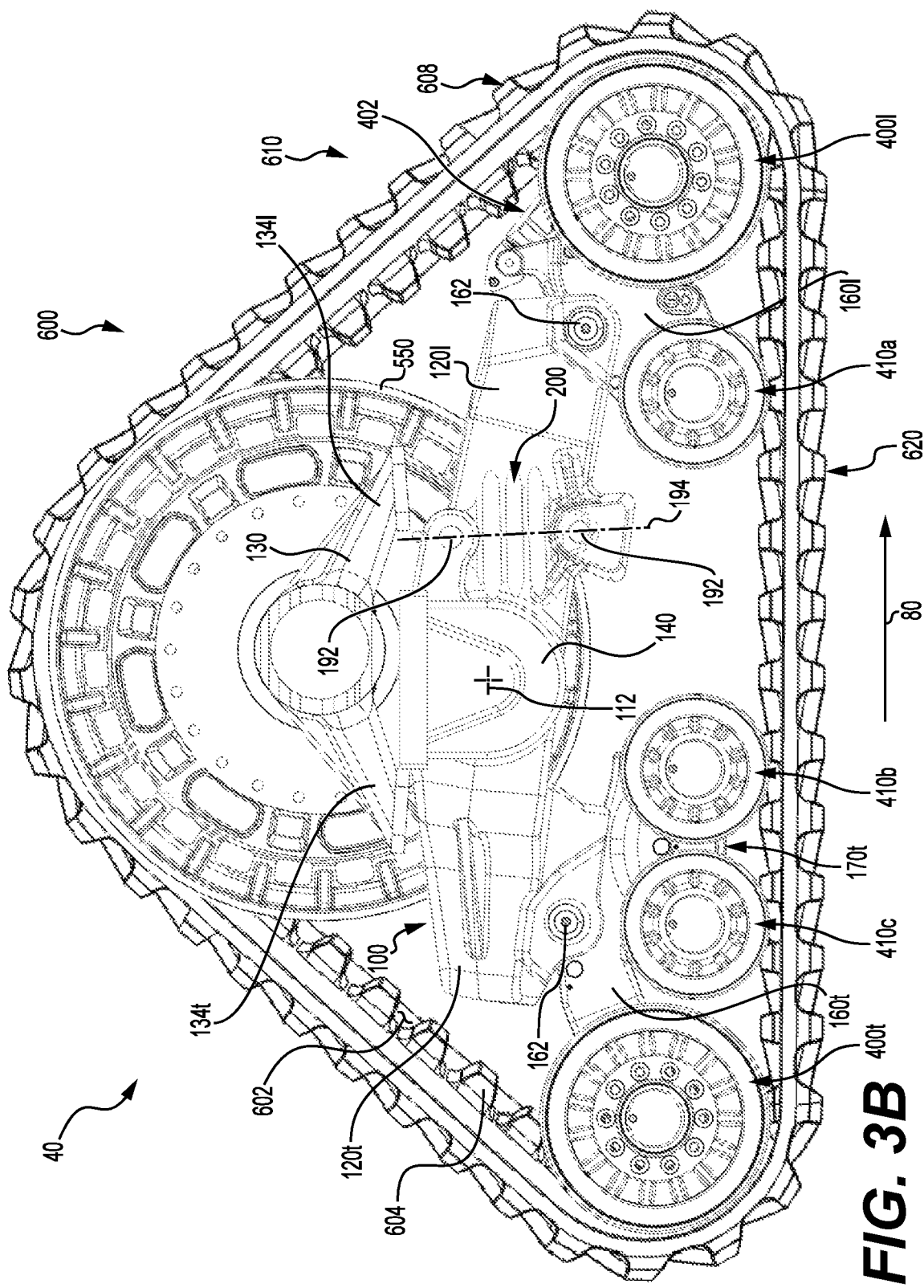
Figure 4:
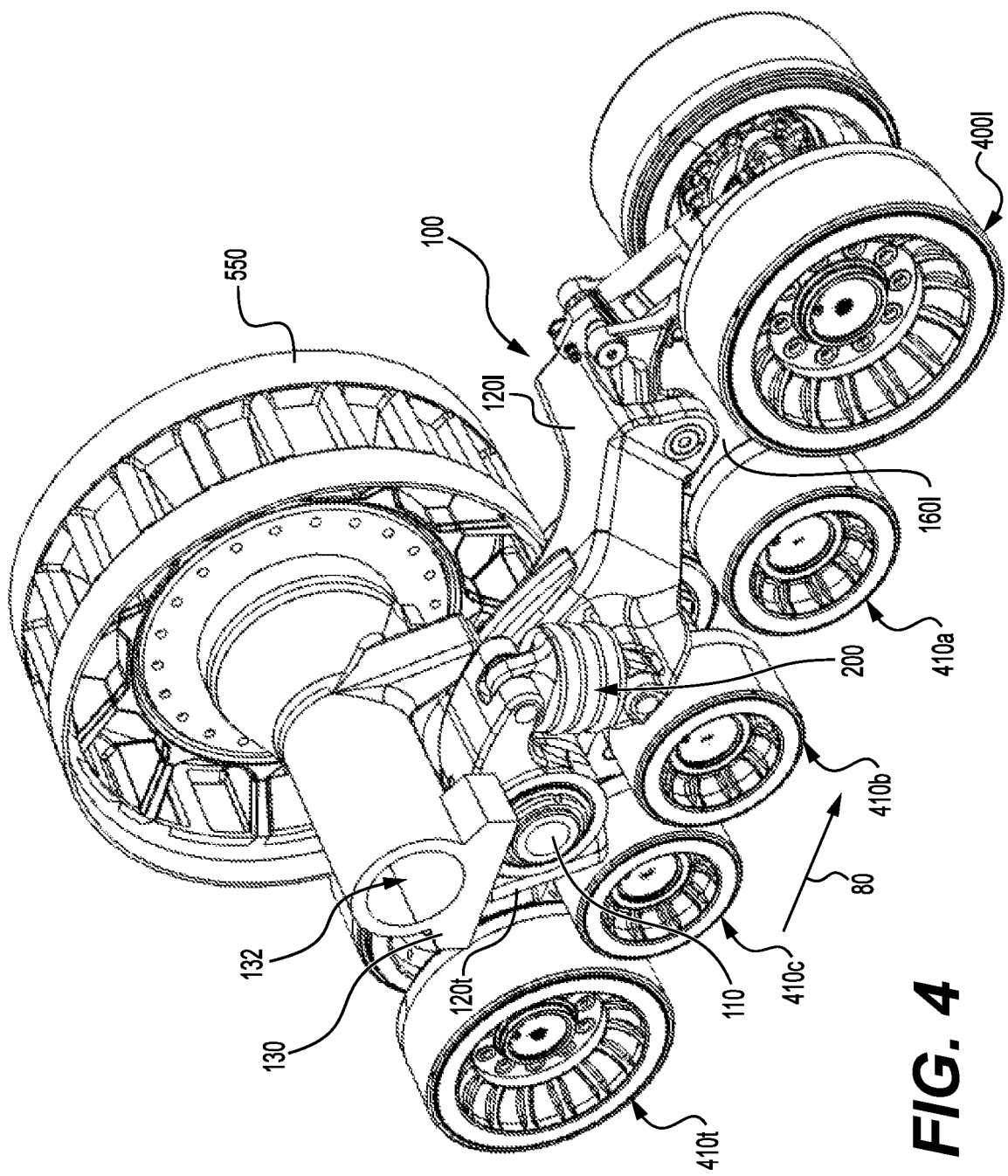
FIG. 4 is a perspective view taken from a top, front, right side of the track system of FIG. 1, with the endless track removed.
Figure 5:
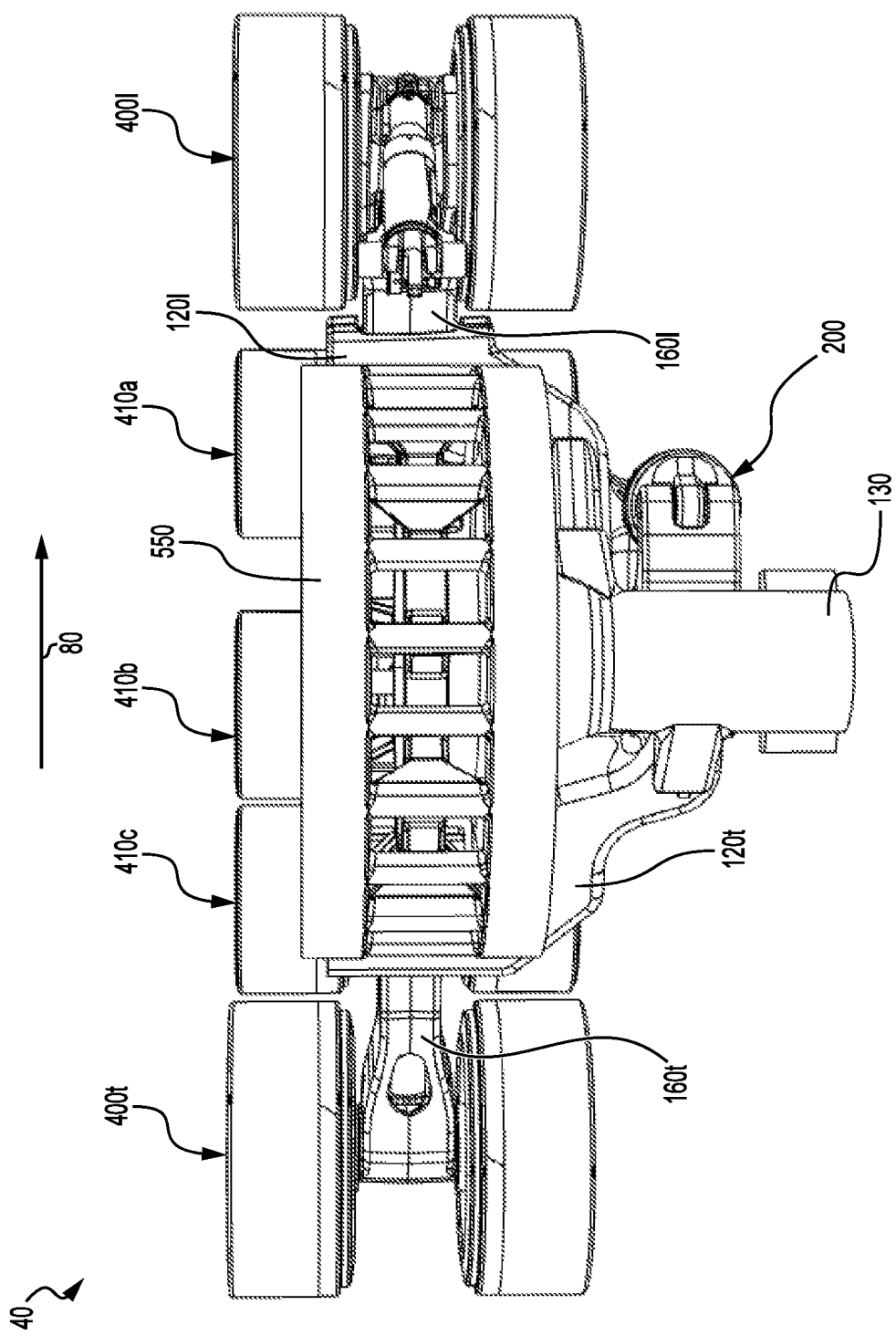
FIG. 5 is a top plan view of the track system of FIG. 4.
Figure 6:
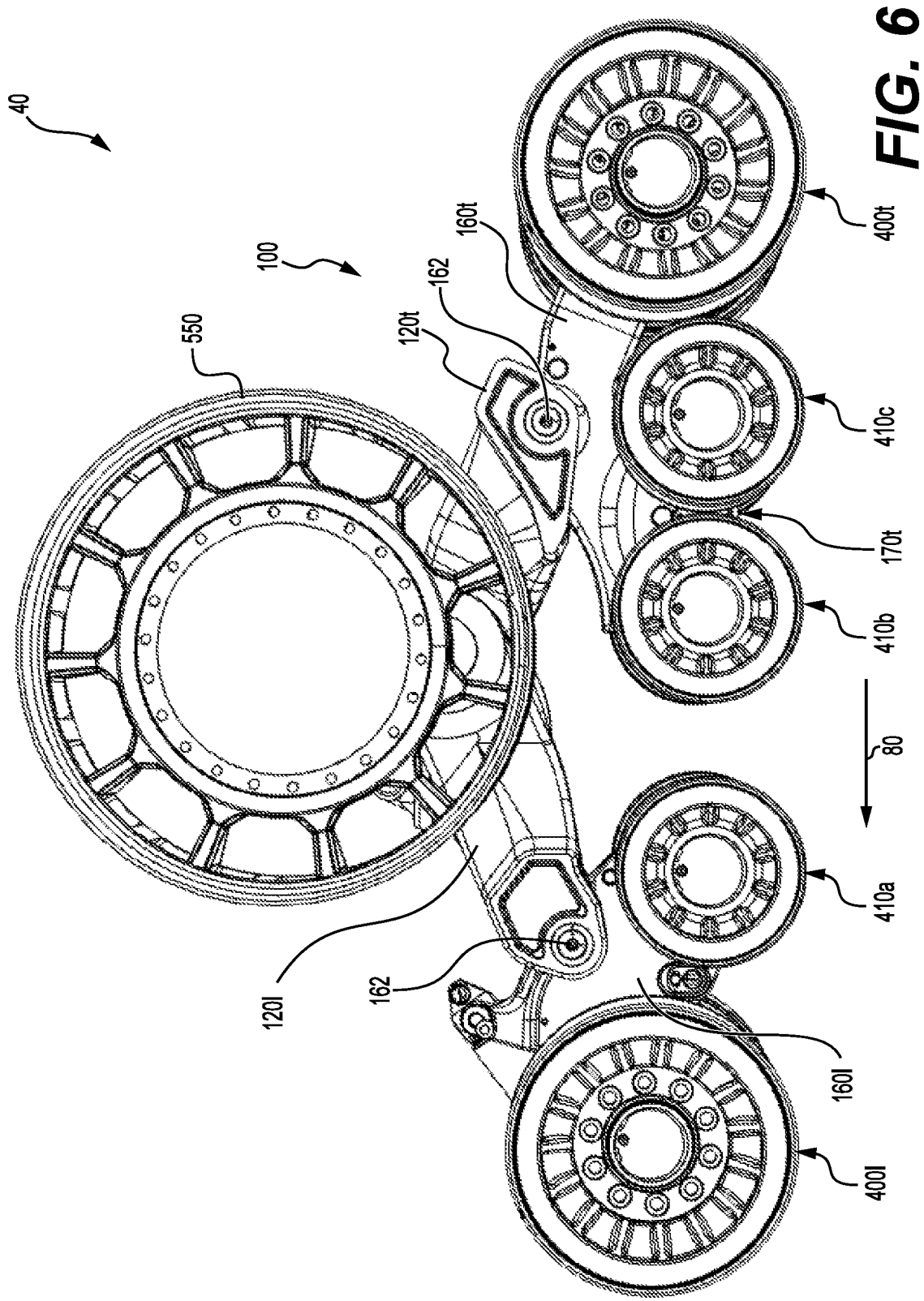
FIG. 6 is a left side elevation view of the track system of FIG. 4.

Referring back to FIGS. 1, 3A and 3B, the endless track 600 is an endless polymeric track. The endless track 600 has an inner surface 602 engaging the leading idler wheel assembly 400l, the trailing idler wheel assembly 400t, and the plurality of support wheel assemblies 410a, 410b, 410c. Lugs 604 are disposed on a central portion of the inner surface 602 and are engageable by the sprocket wheel 550. As such, the track system 40 is a "positive drive" track system. Friction drive track systems are also contemplated as being an alternative to the present implementations. Moreover, hybrid drive track systems (i.e. the sprocket wheel 550 drives the endless track 600 via friction and driving engagement of lugs 604) are also contemplated. The idler and support wheel assemblies 400l, 400t, 410a, 410b, 410c have laterally spaced-apart wheels engaging the inner surface 602 of the endless track 600 on either side of the lugs 604. The endless track 600 also has an outer surface 606 with a tread 608 (FIGS. 1, 3A and 3B) selected for ground engagement. The tread 608 varies in different implementations according to the type of vehicle on which the track system 40 is to be used with and/or the type of ground surface on which the vehicle is destined to travel. It is contemplated that within the scope of the present technology, the endless track 600 may be constructed of a wide variety of materials and structures including metallic components known in track systems. Referring to FIGS. 3A and 3B, the endless track 600 has a leading segment 610, a ground engaging segment 620 and a trailing segment 630. The generally triangular shape of the track system 40 causes the endless track 600 to have the segments 610, 620, 630, but as other configurations of the track system 40 are contemplated, the endless track 600 could have more or less segments in other implementations.

Figure 7:
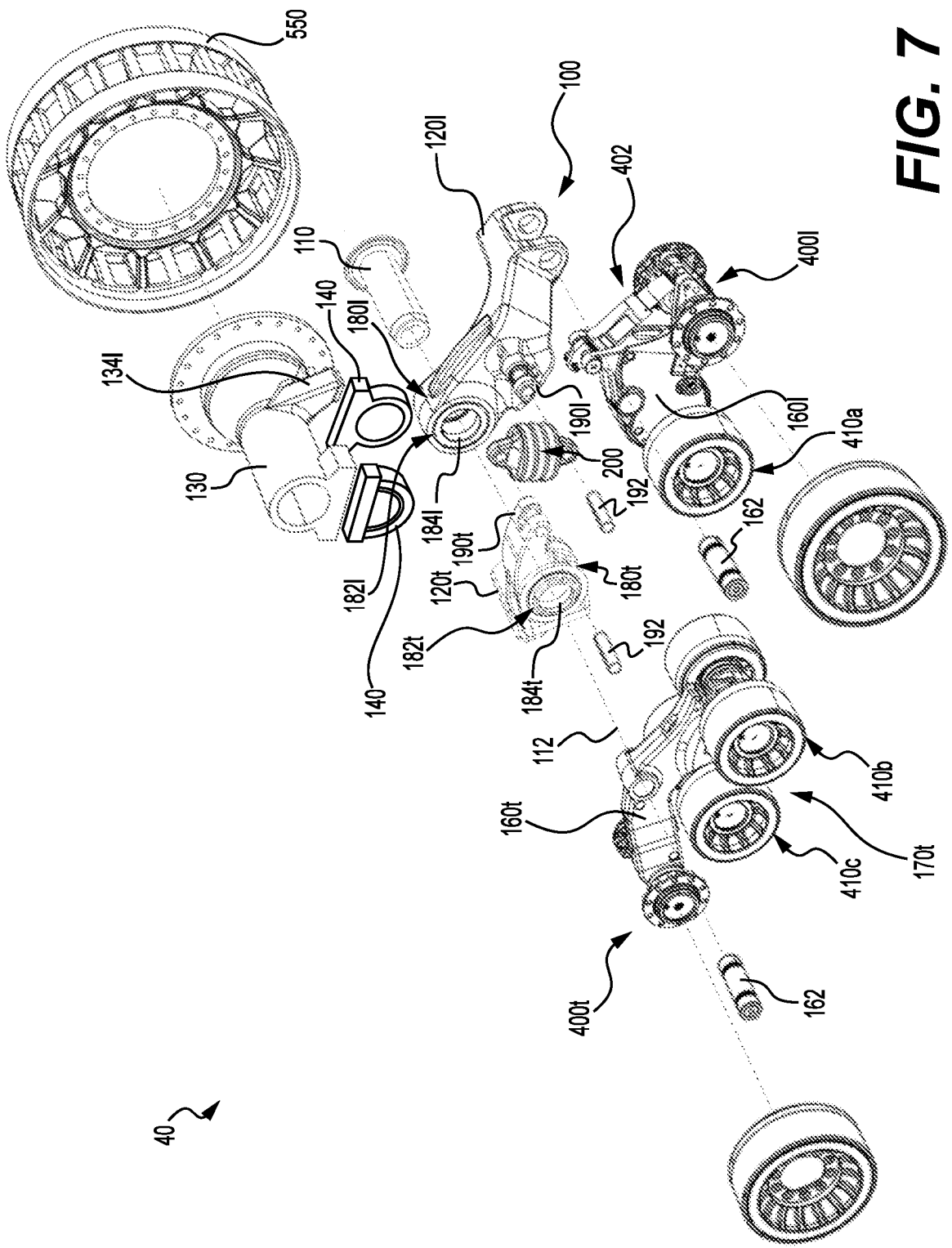
FIG. 7 is a partially exploded, perspective view taken from a top, front, right side of the track system of FIG. 6.
Figure 8:
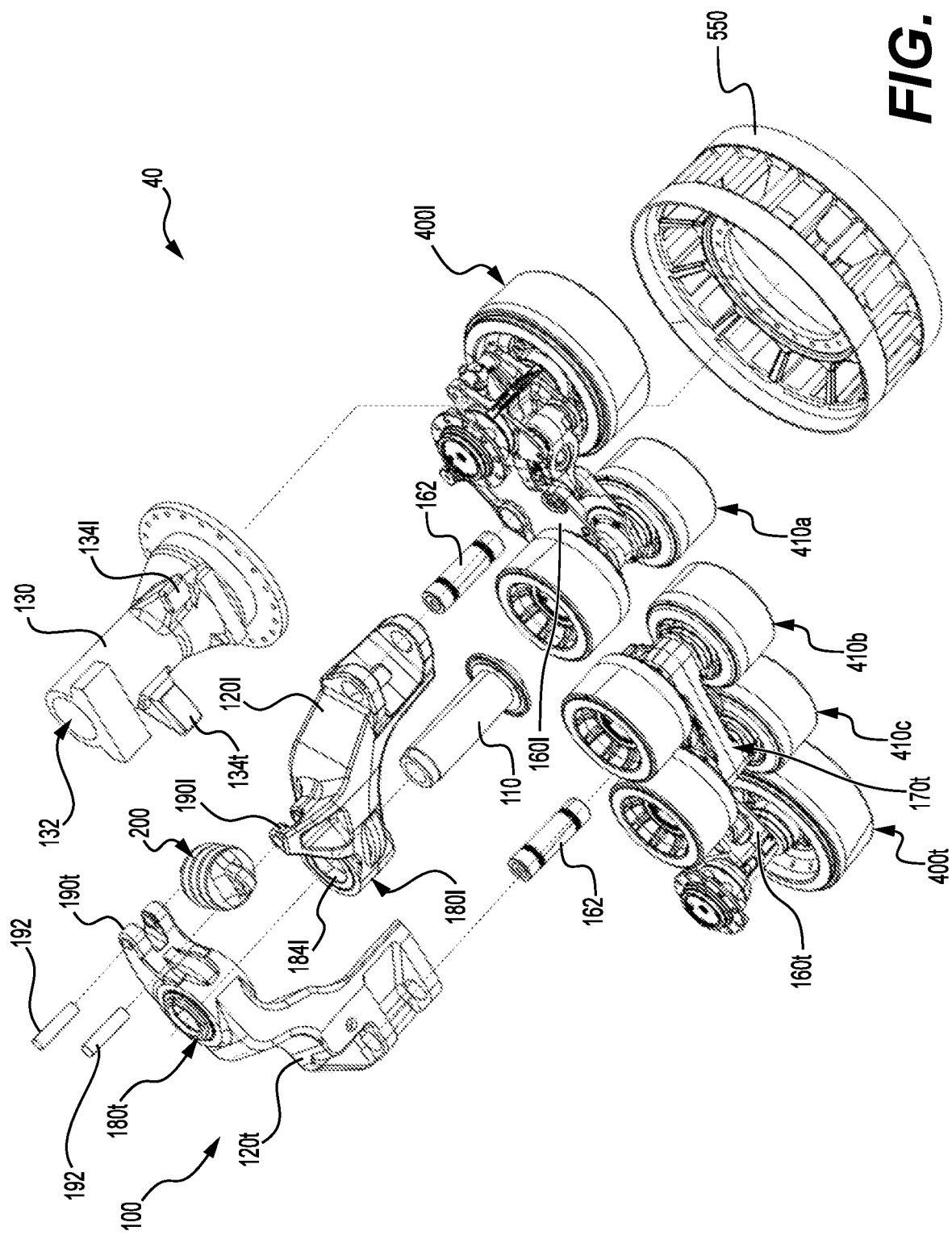
FIG. 8 is a partially exploded, perspective view taken from a bottom, front, right side of the track system of FIG. 6.

Referring now to FIGS. 7 and 8, the leading and trailing frame members 120l, 120t will be described. The leading and trailing frame members 120l, 120 are pivotally connected to and supported by the pivot pin 110. The leading and trailing frame members 120l, 120t have apertures defined by leading and trailing loops 180l, 180t respectively. The pivot pin 110 extends through the apertures of the loops 180l, 180t similar to a pin in a hinge assembly, and enables the pivoting of the leading and trailing frame members 120l, 120t about the pivot axis 112.

Referring to FIGS. 3A, 3B, 7 and 8, the leading and trailing frame members 120l, 120t of the track system 40 define a somewhat scissor-like structure, with each frame member 120l, 120t pivoting about the pivot pin 110, and the resilient member 200 interconnected therebetween. Each one of the leading and trailing wheel-bearing frame members 160l, 160t, is in turn pivotally connected to the leading and trailing frame members 120l, 120t, respectively via the pins 162. The pivoting of each of these structures may assist in reducing the vertical displacements and vibrations transferred from the track system 40 to the chassis 62 of the vehicle 60 under certain conditions. In some implementations, the track system 40 further includes bushing assemblies operatively connected between the axle assemblies rotatably connecting the wheel assemblies 400l, 400t, 410a, 410b, 410c to their corresponding component of the frame assembly 100. The bushing assemblies further assist in reducing the vibrations transferred from the track system 40 to the chassis 62 of the vehicle 60 under certain conditions.

In addition, having the track system 40 with such a scissor-like structure has other advantages in certain situations. For example, as the weight of the vehicle 60 increases, for example during harvesting or loading operations, the scissor-like structure can open and a ground-contacting portion of the endless track 600 occurs over an increased surface area (i.e. the ground engaging segment 620 increases in size as the load borne by the track system 40 increases—at least for some increases in load—depending on the design of a specific track system). As a result, in some circumstances, the pressure applied to the ground by the endless track 600 (owing to the weight and load of the vehicle 60) increases at a lower rate than the weight of the vehicle 60. In certain implementations, this will allow the track system 40 to bear additional loads as compared with conventional track systems.

Referring back to FIGS. 7 and 8, a leading annular spacing 182l is defined between the leading loop 180l and the pivot pin 110. Similarly, a trailing annular spacing 182t is defined between the trailing loop 180t and the pivot pin 110. In the present implementation, the track system 40 further includes a leading annular torsion spring 184l disposed in the leading annular spacing 182l. The leading annular torsion spring 184l is connected to the leading frame member 120l and to the pivot pin 110 for pivotally biasing the leading frame member 120l about the pivot axis 112. Similarly, a trailing annular torsion spring 184t is disposed in the trailing annular spacing 182t. The trailing annular torsion spring 184t is connected to the trailing frame member 120t and the pivot pin 110 for pivotally biasing the trailing frame member 120t about the pivot axis 112. In the present implementation, the leading and trailing annular torsion springs 184l, 184t are rubber bushings, but could be configured otherwise in other implementations. The leading and trailing annular torsion springs 184l, 184t not only bias the leading and trailing frame members 120l, 120t towards a rest position, but also limit the entry of dirt, debris and mud in the annular spacings 182l, 182t that could impair the pivotal connection of the frame members 120l, 120t. In some implementations, the leading annular torsion spring 184l and the trailing annular torsion spring 184t are integrally formed and define an annular torsion spring extending in both the leading and trailing annular spacings 182l, 182t.

In some implementations, the track system 40 includes bearings (not shown) disposed in the leading annular spacing 182l and in the trailing annular spacing 182t. The bearings are rotationally connecting the leading frame member 120l and the trailing frame member 120t to the pivot pin 110. The presence of the annular torsion springs 1841, 184t in such implementations can increase the durability of the bearings as entry of dirt, debris and mud in the annular spacings 1821, 182t is limited by the annular torsion springs 1841, 184t.

Figure 9:
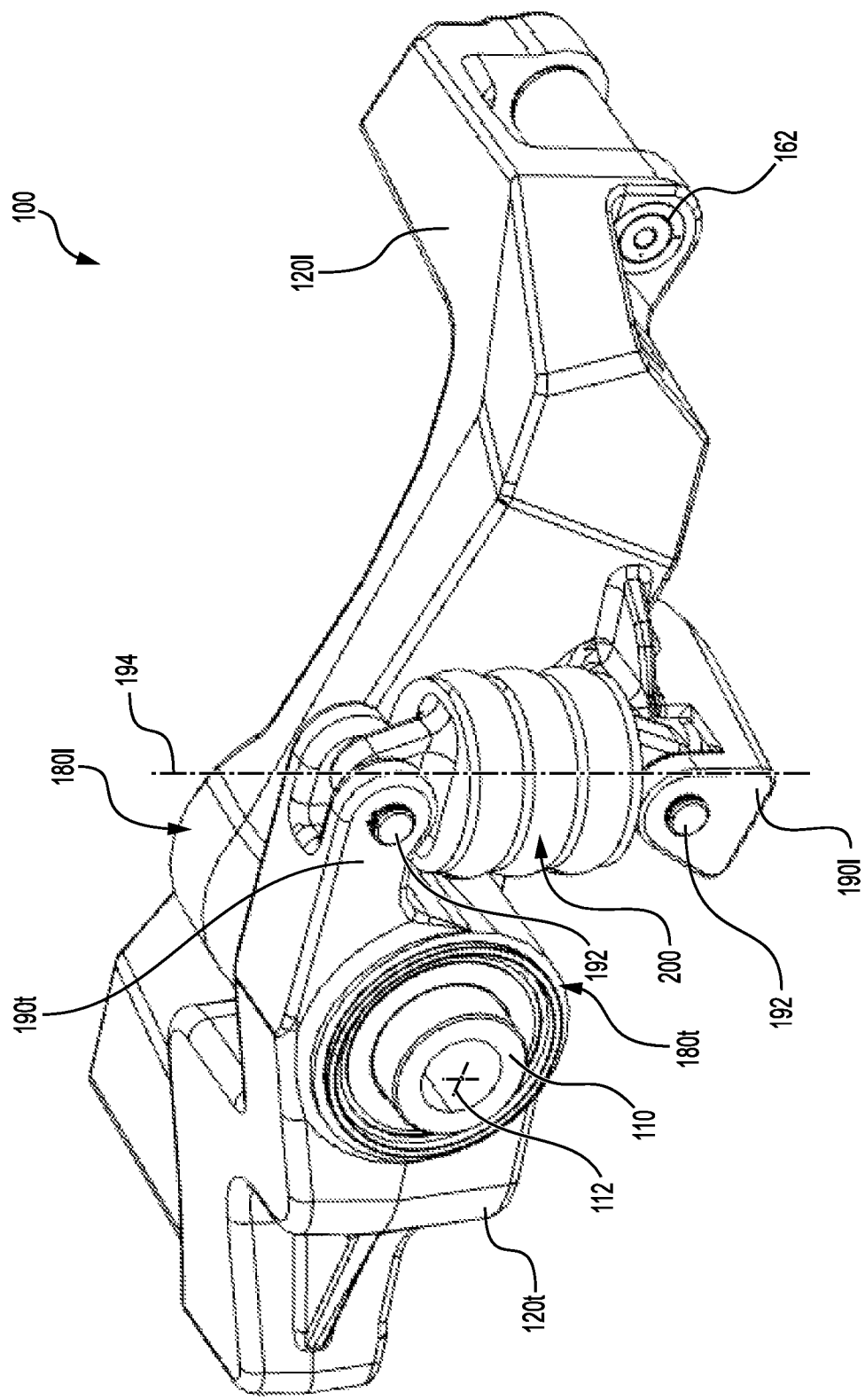
FIG. 9 is a perspective view taken from a top, front, right side of a leading frame member, a trailing frame member, and a resilient member of the track system of FIG. 6.
Figure 10:
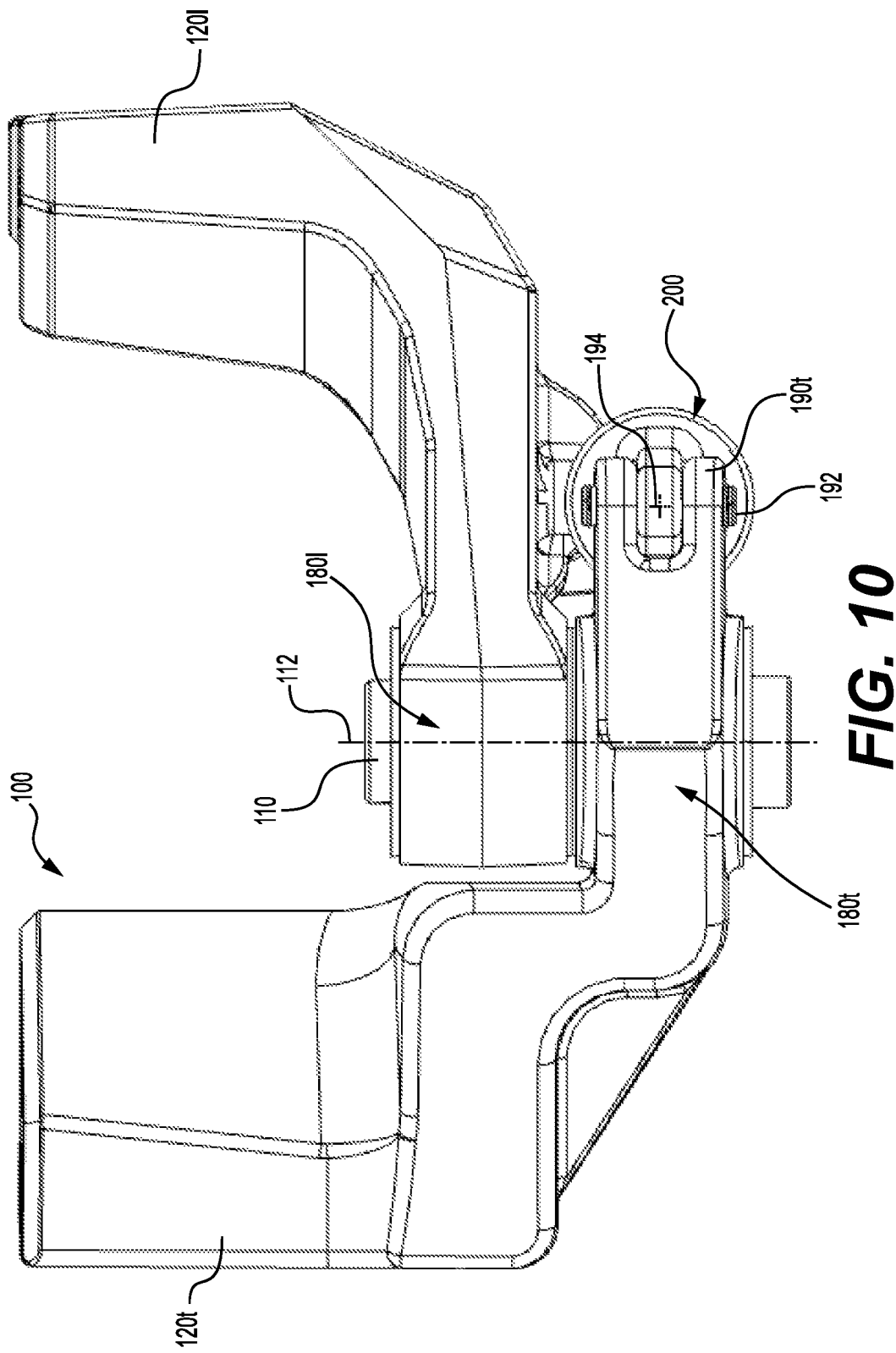
FIG. 10 is a top plan view of the leading frame member, the trailing frame member, and the resilient member of the track system of FIG. 6.

Referring to FIGS. 7 to 12, the leading frame member 1201 has a leading tab 1901 connected thereto and extending on the longitudinal side of the pivot axis 112 that contains the majority of the leading frame member 1201 (i.e. longitudinally at the front of the pivot axis 112). The trailing frame member 120t has a trailing tab 190t connected thereto. The trailing tab 190t projects from the trailing loop 180t and extends on the longitudinal side of the pivot axis 112 that contains the majority of the leading frame member 1201 (i.e. longitudinally at the front of the pivot axis 112). The trailing tab 190t extends above the leading tab 1901. The resilient member 200 is pivotally connected to the leading and trailing tabs 1901, 190t using pins 192. The pivot connection of the resilient member 200 to the leading and trailing frame members 1201, 120t causes that the compression stresses that are applied to the resilient member 200 are along an axis 194 (FIGS. 3A, 3B, 9 and 10) extending between the center of the pins 192. The compression stresses are axially applied along the axis 194 and as such, the resilient member 200 is subjected to no or little shear stresses. This feature can enhance the durability of the resilient member 200 in certain conditions as the materials forming the resilient member 200 work best when subjected to axial compression stresses. As best seen in FIG. 9, when the resilient member 200 is interconnected between the leading and trailing frame members 1201, 120t via the tabs 1901, 190t, the resilient member 200 extends generally vertically. The axis 194 thus extends generally vertically, as seen in FIGS. 3A, 3B, 9 and 10. The expression "generally vertically" means that the resilient member 200 extends in a direction perpendicular to the longitudinal center plane 66 along a height direction of the track system 40 in a plane perpendicular to flat level ground, and within ±30 degrees from the vertical direction. In addition, the resilient member 200 is disposed laterally inwardly from a majority of the leading frame member 1201.

This positioning of the resilient member 200 has been found to improve to overall packaging of the track system 40. In addition, the resilient member 200 is partially protected from dirt, mud and debris projections by the leading frame member 1201. Furthermore, it has been found that having the resilient member 200 extending generally vertically reduces mud accumulation thereon over time compared to other track systems having a resilient member that extends otherwise. For example, in track systems having a resilient member extending horizontally, mud can pile up on surfaces of the resilient member extending horizontally and can become compact and hard over time, at least in certain conditions. The accumulated mud may impair the action the resilient member, and reduce its durability in certain conditions. In contrast, in the present implementation, the resilient member 200 extends generally vertically, and mud has less horizontal surface to accumulate on. Even if mud had accumulated on the upper end of the resilient member 200, the action and durability thereof would not be significantly affected. In other implementations, it is contemplated that the resilient member 200 could be disposed at the rear of the pivot axis 112, and be protected from dirt, mud and debris projections by the trailing frame member 120t.

Moreover, having the annular torsion springs 1821, 182t used in combination with the resilient member 200 has been found to provide improved damping of the vibrations induced in the track system 40 when in use, and provide a relatively low-cost solution to enhance the ride comfort on a track system 40 having a scissor-like structure. This feature also permits that, in some implementations, the resilient member 200 be of a smaller size compared to a track system 40 that would not include the annular torsion springs 1821, 182t, which further improves the overall packaging of the track system 40 and further reduces the possibilities for mud accumulation related problems.

Furthermore and referring to FIG. 13, the resilient member 200 is seen to include three resilient elements 202, and two plates 204 connected to the resilient elements 202 and disposed between the adjacent resilient elements 202. The resilient elements 202 are made of a rubber-based material, and the plates 204 are made of a metallic material, such as steel. It is contemplated that the plates 204 could be made of a different material, such as ultra-high molecular weight polymeric material (UHMW), or aluminium, in other implementations. The plates 204 reduce the undesired deformation of the resilient elements 202 in the lateral direction due to shear stress. The plates 204 thus increase the durability of the resilient elements 202 at least in certain conditions. The resilient member 200 could be structured otherwise in other implementations. For example, the resilient member 200 could include a coil spring, a shock absorber, a fluid-based suspension element, etc.

The multi-member frame assembly 100 and the track system 40 implemented in accordance with some non-limiting implementations of the present technology can be represented as presented in the following numbered clauses.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A multi-member frame assembly for a track system, the multi-member frame assembly being operatively connectable to an axle of a vehicle, the multi-member frame assembly comprising:
    a pivot pin defining a pivot axis, the pivot pin being at least indirectly connectable to the axle of the vehicle;
    a leading frame member pivotally connected to the pivot pin for pivoting about the pivot axis;
    a trailing frame member pivotally connected to the pivot pin for pivoting about the pivot axis, the trailing frame member pivoting independently from the leading frame member; and
    a resilient member pivotally connected to the leading frame member and to the trailing frame member, the resilient member extending generally vertically between the leading frame member and the trailing frame member.

2. The multi-member frame assembly of claim 1, wherein:
    the leading frame member defines a leading loop structured and dimensioned for receiving the pivot pin therein, and a leading annular spacing is defined between the leading loop and the pivot pin;
    the trailing frame member defines a trailing loop structured and dimensioned for receiving the pivot pin therein, and a trailing annular spacing is defined between the trailing loop and the pivot pin; and
    the multi-member frame assembly further includes:
        a leading annular torsion spring disposed in the leading annular spacing, the leading annular torsion spring being connected to the leading frame member and to the pivot pin for pivotally biasing the leading frame member about the pivot axis; and a trailing annular torsion spring disposed in the trailing annular spacing, the trailing annular torsion spring being connected to the trailing frame member and to the pivot pin for pivotally biasing the trailing frame member about the pivot axis.

3. The multi-member frame assembly of claim 1, further comprising a leading tab connected to the leading frame member, and a trailing tab connected to the trailing frame member, the leading and trailing tabs extending on a same longitudinal side of the pivot axis, and the resilient member being pivotally connected to the leading and trailing tabs.

4. A track system for use with a vehicle having a chassis and an axle extending laterally outwardly from the chassis for driving the track system, the track system comprising:
a multi-member frame assembly operatively connectable to the axle, the multi-member frame assembly including:
a pivot pin defining a pivot axis, the pivot pin being at least indirectly connectable to the axle of the vehicle;
a leading frame member pivotally connected to the pivot pin for pivoting about the pivot axis;
a trailing frame member pivotally connected to the pivot pin for pivoting about the pivot axis, the trailing frame member pivoting independently from the leading frame member;
a leading wheel-bearing frame member at least indirectly pivotally connected to the leading frame member; and
a trailing wheel-bearing frame member at least indirectly pivotally connected to the trailing frame member;
a resilient member interconnecting the leading frame member and the trailing frame member;
a leading idler wheel assembly rotatably connected to the leading wheel-bearing frame member;
a trailing idler wheel assembly rotatably connected to the trailing wheel-bearing frame member;
a first support wheel assembly at least indirectly connected to the leading wheel-bearing frame member;
a second support wheel assembly at least indirectly connected to the trailing wheel-bearing frame member; and
a sprocket wheel operatively connected to the axle.

5. The track system of claim 4, wherein:
the leading frame member defines a leading loop structured and dimensioned for receiving the pivot pin therein, and a leading annular spacing is defined between the leading loop and the pivot pin;
the trailing frame member defines a trailing loop structured and dimensioned for receiving the pivot pin therein, and a trailing annular spacing is defined between the trailing loop and the pivot pin; and
the track system further includes:
a leading annular torsion spring disposed in the leading annular spacing, the leading annular torsion spring being connected to the leading frame member and to the pivot pin for pivotally biasing the leading frame member about the pivot axis; and
a trailing annular torsion spring disposed in the trailing annular spacing, the trailing annular torsion spring being connected to the trailing frame member and to the pivot pin for pivotally biasing the trailing frame member about the pivot axis.

6. The track system of claim 5, wherein the leading and trailing annular torsion springs are rubber bushings.

7. The track system of claim 6, further comprising a leading tab connected to the leading frame member, and a trailing tab connected to the trailing frame member, the leading and trailing tabs extending on a same longitudinal side of the pivot axis, and the resilient member being pivotally connected to the leading and trailing tabs.

8. The track system of claim 7, wherein the resilient member extends generally vertically.

9. The track system of claim 8, wherein the resilient member is disposed laterally inwardly from a majority of at least one of the leading and trailing frame members.

10. The track system of claim 4, wherein the resilient member includes first and second resilient elements, and a plate connected to the first and second resilient elements and disposed between the first and second resilient elements.

11. The track system of claim 4, further comprising:
an axle casing rotatably connectable to the axle; and
at least one pivot pin bracket connecting the axle casing to the pivot pin, thereby operatively connecting the multi-member frame assembly to the axle of the vehicle.

12. The track system of claim 11, further comprising leading and trailing stops connected to the axle casing, the leading and trailing stops being structured and dimensioned to limit pivotal movement of the leading and trailing frame members.

13. The track system of claim 4, further comprising an endless track extending around the sprocket wheel, the leading idler wheel assembly, the trailing idler wheel assembly, and the first and second support wheel assemblies, the endless track being drivable by the sprocket wheel.

14. The track system of claim 13, wherein the endless track has a ground-contacting area that increases in size as a load borne by the track system increases.

* * * * *